US012633226B2

(12) United States Patent
Shenkan

(10) Patent No.: US 12,633,226 B2
(45) Date of Patent: May 19, 2026

(54) AUTOMATED CUSTOMIZATION VIRTUAL ECOSYSTEM

(71) Applicant: JUST RIGHT READER, INC., Fort Worth, TX (US)

(72) Inventor: Sara Shenkan, Forth Worth, TX (US)

(73) Assignee: JUST RIGHT READER INC., Fort Worth, TX (US)

( * ) Notice: Subject to any disclaimer, the term of this patent is extended or adjusted under 35 U.S.C. 154(b) by 0 days.

(21) Appl. No.: 18/444,387

(22) Filed: Feb. 16, 2024

(65) Prior Publication Data

US 2024/0282209 A1 Aug. 22, 2024

Related U.S. Application Data

(60) Provisional application No. 63/446,703, filed on Feb. 17, 2023.

(51) Int. Cl.
*G09B 5/06* (2006.01)
*G06F 16/435* (2019.01)
(52) U.S. Cl.
CPC ........... *G09B 5/065* (2013.01); *G06F 16/435* (2019.01)

(58) Field of Classification Search
CPC .............................. G06F 16/435; G09B 5/065
See application file for complete search history.

(56) References Cited

U.S. PATENT DOCUMENTS

2014/0273721 A1* 9/2014 Katan ...................... A63H 3/36
446/268
2017/0103432 A1* 4/2017 Borchetta .......... G06Q 30/0279

* cited by examiner

*Primary Examiner* — Kesha Frisby
(74) *Attorney, Agent, or Firm* — DENTONS Durham Jones Pinegar

(57) ABSTRACT

A system and method can be provided for automatically generating customized content. For example, the method can involve providing text content to a user. The text content can include a unique identifier. The unique identifier can link to a content portal unique for the user. The method can further involve receiving an input corresponding to the unique identifier. The input can be received via a user device. Additionally, the method can involve automatically launching the content portal in a browser of the user device. The method can further involve autogenerating customized content for the user. The customized content can include an eBook and the customized content can be customized based on a skill level of the user and on an interest of the user.

13 Claims, 9 Drawing Sheets

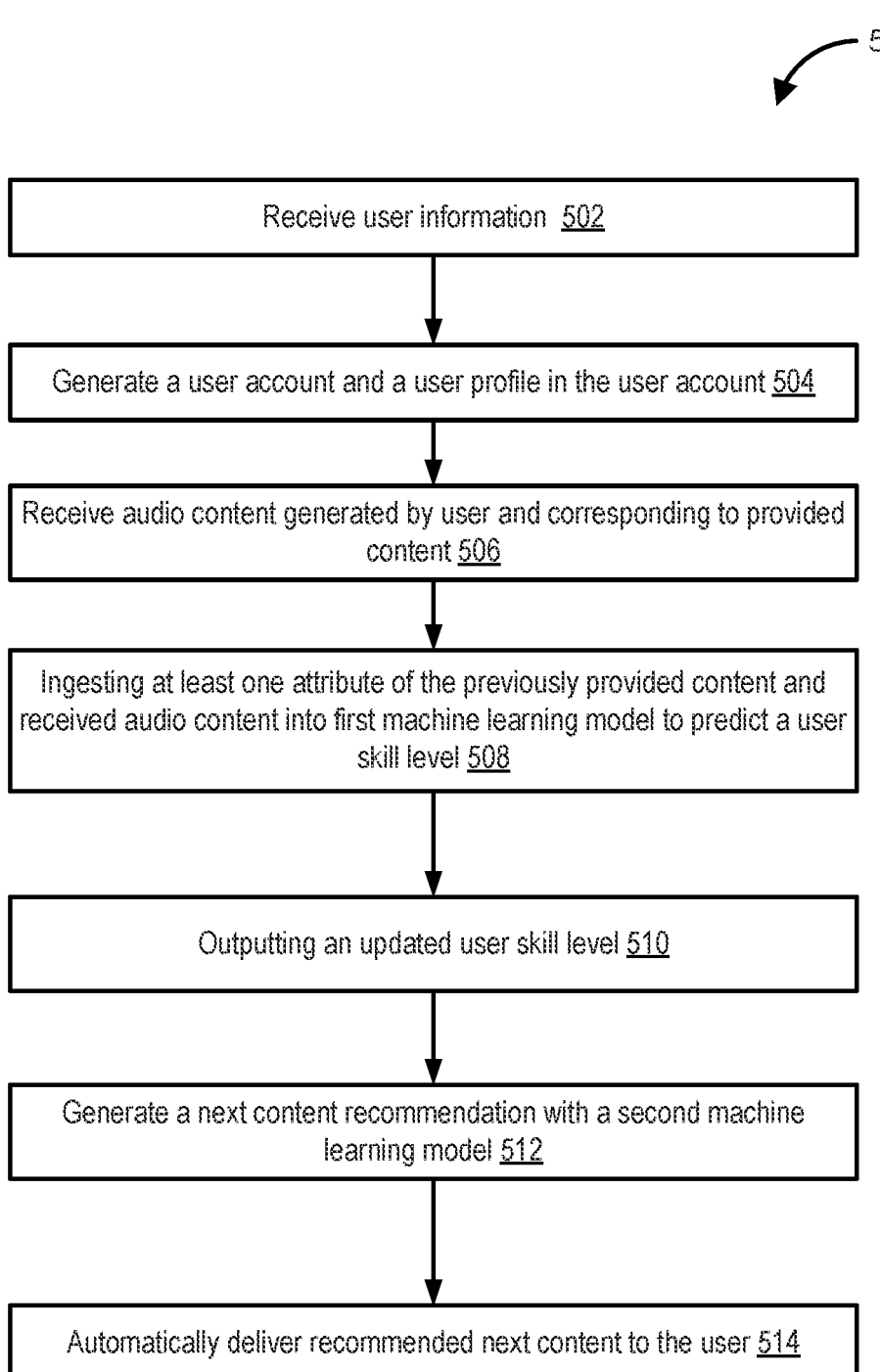

500

Receive user information  502

Generate a user account and a user profile in the user account 504

Receive audio content generated by user and corresponding to provided content 506

Ingesting at least one attribute of the previously provided content and received audio content into first machine learning model to predict a user skill level 508

Outputting an updated user skill level 510

Generate a next content recommendation with a second machine learning model 512

Automatically deliver recommended next content to the user 514

Receive primary user information 602

Generate a primary user profile 604

Receive information identifying content previously received by the user 606

Retrieve information from the linked user accounts 608

Recommend next content to the primary user 610

700

Provide text content including a unique identifier to user 702

Receive an input corresponding to the unique identifier 704

Automatically launch a content portal in a browser of a user device 706

Autogenerate customized content for the user 708

Provide the customized content to the user via the content portal 710

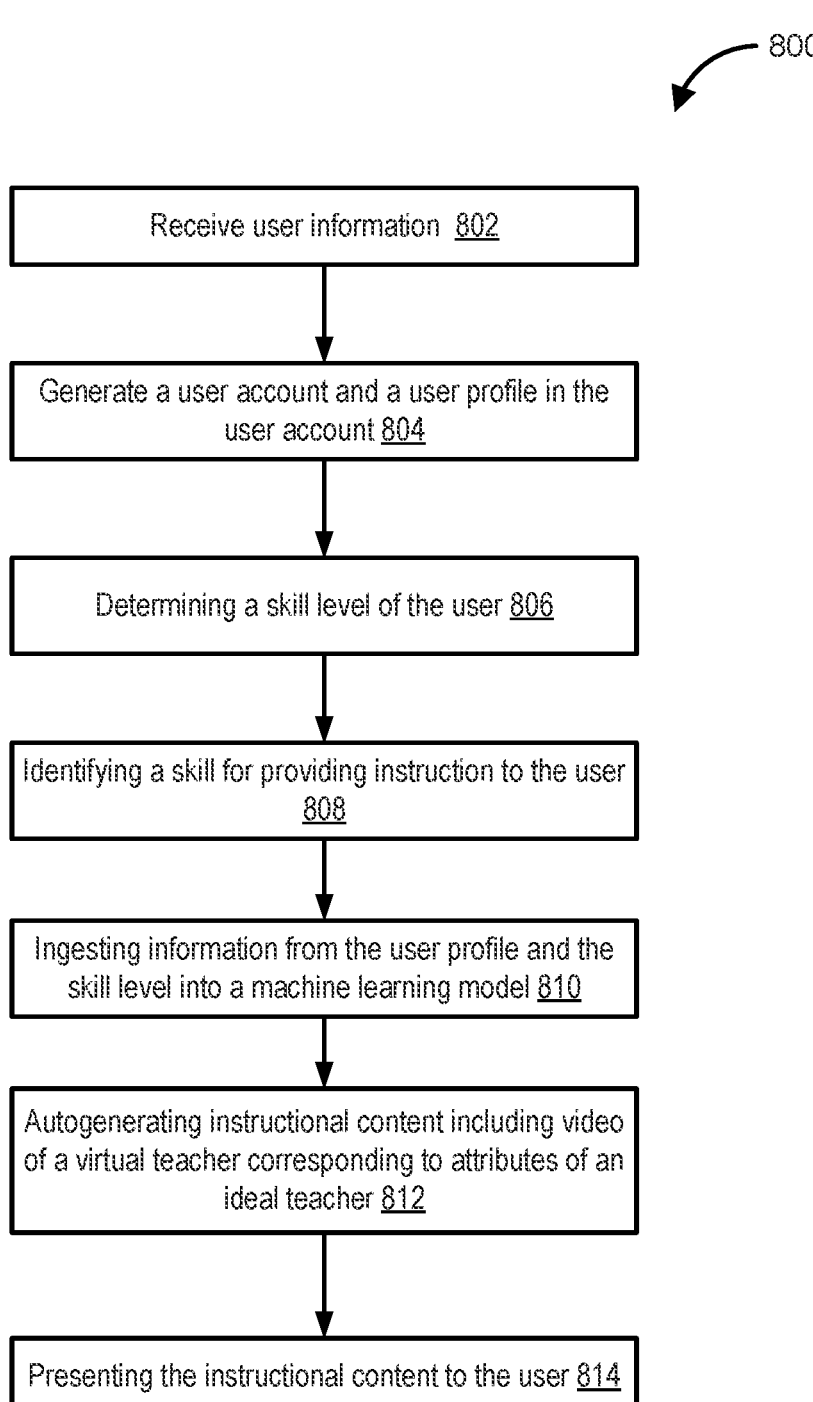

800

Receive user information  802

Generate a user account and a user profile in the user account 804

Determining a skill level of the user 806

Identifying a skill for providing instruction to the user 808

Ingesting information from the user profile and the skill level into a machine learning model 810

Autogenerating instructional content including video of a virtual teacher corresponding to attributes of an ideal teacher 812

Presenting the instructional content to the user 814

Figure 8

AUTOMATED CUSTOMIZATION VIRTUAL ECOSYSTEM

CROSS-REFERENCE TO RELATED APPLICATIONS

This application is based on, and claims the benefit of, U.S. Provisional Application No. 63/446,703, filed Feb. 17, 2023, and which is incorporated herein by reference in its entirety. This application is related to U.S. Provisional Application No. 63/446,692, filed Feb. 17, 2023, and to U.S. application Ser. No. 18/444,440, entitled "Automated Customization Engine", and filed on Feb. 16, 2024, the entirety of each of which is hereby incorporated by reference herein.

BACKGROUND

Interactive reading can be a dynamic approach to storytelling and education in which multi-media elements and user input are integrated to create an immersive or customizable experience. The interactive reading can be enabled by technical platforms such as eBooks, applications, websites, or virtual reality. The technical platforms can allow users to make choices that influence a story. In educational settings, the technical platforms can present educational elements such as quiz questions, animations, or other suitable elements which enhance learning experiences. It can be desirable to improve and personalize interactive reading environments, particularly in educational settings, to improve user experience and create engaging, effective digital learning environments.

SUMMARY

Aspects of the present relate to a method of for customized content delivery. In some embodiments, the method can include providing text content to a user. The text content can include a unique identifier. The unique identifier can link to a content portal unique for the user. The method can further include receiving, via a user device, an input corresponding to the unique identifier. The method can also include automatically launching the content portal in a browser of the user device. Additionally, the method can include autogenerating customized content for the user. The customized content can include an eBook and the customized content can be customized based on a skill level of the user and on an interest of the user.

In some embodiments, the customized content can further include a video, which can be generated based on a user learning preference.

In some embodiments, the autogeneration of the customized content can be triggered based on receiving the input corresponding to the unique identifier.

In some embodiments, the method can further include performing at least one procedure to verify an identity of the user device and of the content portal. In some embodiments, the at least one procedure can involve an exchange of at least one token.

In some embodiments, the customized content for the user can be autogenerated via a machine learning model. The machine learning model can be configured to auto-generate the customized content based on at least the skill level of the user and the interest of the user.

In some embodiments, the method can further include outputting the customized content to the user via the content portal in the browser of the user device.

In some embodiments, the unique identifier can include a 2D barcode.

In some embodiments, a system can comprise a processor and a memory that includes instructions executable by the processor for causing the processor to perform operations related to customized content delivery. For example, the operations can include providing text content to a user. The text content can include a unique identifier. The unique identifier can link to a content portal unique for the user. The operations can further include receiving, via a user device, an input corresponding to the unique identifier. The operations can also include automatically launching the content portal in a browser of the user device. Additionally, the operations can include autogenerating customized content for the user. The customized content can include an eBook and the customized content can be customized based on a skill level of the user and on an interest of the user.

In some embodiments, a non-transitory computer-readable medium can include instructions that are executable by a processor for causing the processor to perform operations related to customized content delivery. For example, the operations can include providing text content to a user. The text content can include a unique identifier. The unique identifier can link to a content portal unique for the user. The operations can further include receiving, via a user device, an input corresponding to the unique identifier. The operations can also include automatically launching the content portal in a browser of the user device. Additionally, the operations can include autogenerating customized content for the user. The customized content can include an eBook and the customized content can be customized based on a skill level of the user and on an interest of the user.

BRIEF DESCRIPTION OF THE DRAWINGS

The present disclosure is described in conjunction with the appended figures:

FIG. 5 is a flowchart illustrating one embodiment of a process for next content selection.

FIG. 8 is a flowchart illustrating one embodiment of a process for autogenerating a virtual teacher.

DETAILED DESCRIPTION

Figure 1:
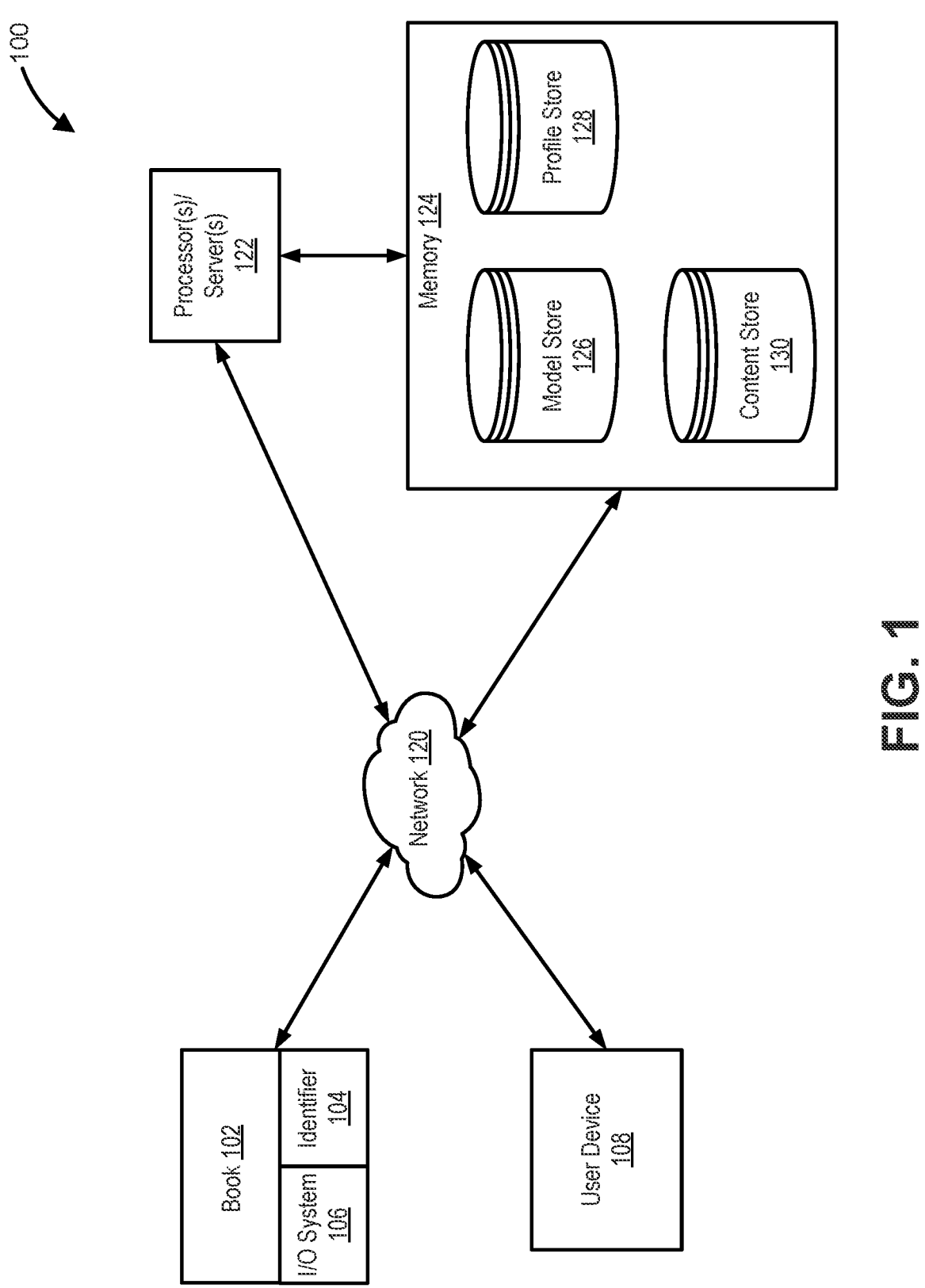
FIG. 1 is a block diagram showing illustrating an example of a content customization and delivery system.

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

In some embodiments, a method of for customized content delivery can be performed. For example, the method can involve providing text content to a user. The text content can include a unique identifier, which can link to a content portal unique for the user. The method can further involve receiving an input corresponding to the unique identifier. The input can be received via a user device. The method can also involve automatically launching the content portal in a browser of the user device. Additionally, the method can involve autogenerating customized content for the user. The customized content can include an eBook and can be customized based on a skill level of the user and on an interest of the user.

By including a unique identifier in a text content, and autogenerating customized content in response to input corresponding to the unique identifier, personalized and adaptive content can be provided. The personalization of the customized content can then be enhanced by generating the content based off at least a skill level and interest of the user. That is, the customized content can be generated such that the information, format of information, etc. is comprehensible by the user considering the user skill level. In this way, a comprehensibility of the customized content for the user can be improved, which can further improve an ability of the user to engage and learn form the customized content. Additionally, the customized content can be generated such that it includes a hobby, location, person, etc. of interest to the user to further enhance engagement of the user with the customized content.

Additionally, content can be automatically generated and output at a browser of a user device as a result of the unique identifier being, for example, read by the user device. The unique identifier can be associated with text content (e.g., a book or eBook). Thus, the customized content can be provided to users of printed books. Additionally, in examples in which the user is using an eBook, the customized content can be provided without interrupting operations of the device from which the eBook is accessed (e.g., other interactive elements of the eBook). For example, the user device can be separate from the device from which the eBook is accessed or the browser can be separate from a browser or application from which the eBook is accessed.

Furthermore, in some examples, launching the content portal can involve performing at least one procedure to verify an identity of the user, user device, the unique content portal, or a combination thereof. As a result, the access to the content portal and, therefore, to the customized content can be provided in a secure manner. Additionally, the integrity of the content portal can be protected. For example, by verifying the identity of the content portal, a potential security threat can be efficiently identified and/or unauthorized tampering with or access to the content portal can be prevented.

In some embodiments, the customized content further can include a video generated based on a user learning preference.

In some embodiments, the auto-generation of the customized content can be triggered based on receiving the input corresponding to the unique identifier.

In some embodiments, the method can further involve performing at least one procedure to verify an identity of the user device and of the unique content portal. The at least one procedure can involve an exchange of at least one token.

In some embodiments, the customized content for the user can be autogenerated via a machine learning model. The machine learning model can be configured to auto-generate the customized content based on at least the skill level of the user and the interest of the user.

In some embodiments, the method can involve outputting the customized content to the user via the content portal in the browser of the user device.

In the appended figures, similar components and/or features may have the same reference label. Where the reference label is used in the specification, the description is applicable to any one of the similar components having the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

With reference now to FIG. 1, a block diagram is shown illustrating various components of a content customization and delivery system 100 which implements and supports certain embodiments and features described herein. The content customization and delivery system 100 may include one or more books 102. Some or all of the one or more books 102 can comprise a physical, printed book, or can comprise an eBook. Thus, in some embodiments, the books 102 can comprise written content, which can be embodied in a digital format or in a printed format.

In some embodiments in which the book 102 comprises a printed book the book can include an identifier 104. The identifier 104 can comprise a computer readable identifier, which can be, for example, a computer readable code. In some embodiments, the computer readable code can be a barcode such as a 1D barcode (e.g., a universal product code (UPC)), a 2D barcode (e.g., a Quick Response (QR) code), a 3D barcode, or the like. In some embodiments, the computer readable identifier can comprise an electronic identifier such as a radio-frequency identification (RFID) tag, a near field communication (NFC) tag, or the like.

In some embodiments, the book 102 can include one or several features configured to assist the user in reading the book. These features can include an Input/output system (I/O system) 106. The I/O system can include, for example, one or several speakers, microphones, cameras, or the like. In some embodiments, the I/O system 106 can be configured generate data while the user is reading the book, and in some embodiments, the I/O system 106 can evaluate the user's reading and provide feedback to the user.

In some embodiments, the book 102 can comprise a processor. In some embodiments, the processor can include one or several microprocessors, such as one or several Central Processing Units (CPUs), and/or one or several Graphics Processing Units (GPUs), or a combination thereof. The processor can be a commercially available microprocessor from Intel®, Advanced Micro Devices, Inc.®, Nvidia Corporation ®, or the like.

The processor can be communicatively coupled with memory. The memory can comprise stored instructions in the form of computer code, that when executed by the processor and/or the controller, cause the processor and/or controller to take one or several actions. The memory can comprise primary and/or secondary memory. The memory can include, for example, cache memory, RAM, ROM, PROM, EPROM, EEPROM, one or several solid-state drives (SSD), one or several hard drives or hard disk drives, or the like. Thus, in some embodiments, the memory can include volatile and/or non-volatile memory.

In some embodiments, the instructions in the memory can control the processor to receive information via the I/O system 106, to process that information, and to provide an output. For example, the processor can include, receiving sound via a speaker. The sound can be speech from a user reading the written content of a book out loud. The processor can further evaluate aspects of the speech including for example, an accuracy of the words read out loud with respect to the written content, pronunciation of the words with respect to the written content, a speed at which each word in the written content is spoken, a pace or rhythm of the speech, stress patterns of the speech, intonation of the speech, or the like. Additionally, based on evaluating aspects of the speech, the processor can provide feedback to the user via the I/O system 106. In some embodiments, this feedback can include generated speech of the written content which is played back to the user via the speaker. For example, the processor can identify one or more words which the user pronounced incorrectly, one or more sentences that the user took more than a threshold time to read out loud, or a combination thereof. The generated speech can include the words or sentences which the processor identified. Thus, by playing the feedback (e.g., the generated speech) back to the user, the processor can provide corrective instruction to the user.

The system 100 can include a user device 108. The user device 108 may display content received from the user and/or from other components in the system 100, and may support various types of user interactions with the content. User devices 108 may include mobile devices such as smartphones, tablet computers, personal digital assistants, and wearable computing devices. Such mobile devices may run a variety of mobile operating systems and may be enabled for Internet, e-mail, short message service (SMS), Bluetooth®, mobile radio-frequency identification (M-RFID), and/or other communication protocols. Other user devices 108 may be general purpose personal computers or special-purpose computing devices including, by way of example, personal computers, laptop computers, work-station computers, projection devices, and interactive room display systems. Additionally, user devices 108 may be any other electronic devices, such as a thin-client computers, Internet-enabled gaming systems, business or home appliances, and/or personal messaging devices, capable of communicating over a network(s).

In different contexts of system 100, user devices 108 may correspond to different types of specialized devices, for example, student devices and teacher devices in an educational network, employee devices and presentation devices in a company network, different gaming devices in a gaming network, etc. In some embodiments, a plurality of user devices 108 may operate in the same physical location, such as a classroom or conference room. In such cases, the devices may contain components that support direct communications with other nearby devices, such as wireless transceivers and wireless communications interfaces, Ethernet sockets or other Local Area Network (LAN) interfaces, etc. In other implementations, the user devices 108 need not be used at the same location, but may be used in remote geographic locations in which each user device 108 may use security features and/or specialized hardware (e.g., hardware-accelerated SSL and HTTPS, WS-Security, firewalls, etc.) to communicate with other components of the system 100.

In some embodiments, the system 100 may include one or more communication networks 120. Although only a single network 120 is identified in FIG. 1, the system 100 may include any number of different communication networks between any of the computer servers and devices shown in FIG. 1 and/or other devices described herein. Communication networks 120 may enable communication between the various computing devices, servers, and other components of the system 100. As discussed below, various implementations of system 100 may employ different types of networks 120, for example, computer networks, telecommunications networks, wireless networks, and/or any combination of these and/or other networks.

The system 100 may include one or several navigation systems or features including, for example, the Global Positioning System ("GPS"), GALILEO (e.g., Europe's global positioning system), or the like, or location systems or features including, for example, one or several transceivers that can determine location of the one or several components of the system 100 via, for example, triangulation. These navigation systems can be included as part of the network 120.

In some embodiments, network 120 can include or several features that can communicate with one or several components of the system 100 including, for example, with one or several of the user devices 108 and/or with one or several books 102. In some embodiments, this communication can include the transmission of a signal from the navigation system which signal is received by one or several components of the system 100 and can be used to determine the location of the one or several components of the system 100.

The system 100 can include one or several processors and/or servers 122. In some embodiments, the one or several processors and/or servers 122 can be configured to communicate with the book 102, the user device 108, or a combination thereof. For example, the processors and/or servers 122 can receive one or several communications from the book 102, the user device 108, or the combination thereof. Additionally or alternatively, the processors and/or servers 122 can send one or several communications to the book 102, to the user device 108, or the combination thereof. In some embodiments, the processors and/or servers can receive data relating to a user from the book 102, the user device 108, or the combination thereof. The processors and/or servers 122 may also provide content to the user via the book 102, the user device 108, or the combination thereof. In some embodiments, information relating to the user, such as which written content the user has consumed, user performance in consuming the written content, or a user skill level can be received by the processors and/or servers 122, from the book 102, the user device 108, or the combination thereof. In some embodiments, the processors and/or servers 122 can, based on the received information, identify an updated user skill level, update a user profile, identify content for providing to the user, and/or provide content to the user.

The processor 122 can include, in some embodiments, one or several servers. The one or several servers can be any desired type of server including, for example, a rack server, a tower server, a miniature server, a blade server, a mini rack server, a mobile server, an ultra-dense server, a super server, or the like, and may include various hardware components, for example, a motherboard, a processing unit, memory systems, hard drives, network interfaces, power supplies, etc. The servers 122 may include one or more server farms, clusters, or any other appropriate arrangement and/or combination or computer servers. The processor and/or servers 122 may act according to stored instructions located in a memory subsystem of the server 122, and may run an operating system, including any commercially available server operating system and/or any other operating systems discussed herein.

The processor 122 can be communicatively coupled with memory 124. The memory 124, also referred to herein as a database server can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 124, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatively connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 124 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Databases may comprise stored data relevant to the functions of the system 100. In some embodiments, multiple databases may reside on a single database server 124, either using the same storage components of data server 124 or using different physical storage components to assure data security and integrity between databases. In other embodiments, each database may have a separate dedicated database server 124.

The memory 124 can comprise one or several databases which can store information used by processor 122. These databases can include, for example, a model store 126, a profile store 128, and a content store 130. In some embodiments, the model store 126 can store one or several machine learning models which can be configured to generate one or several predictions and/or to generate one or several outputs.

In some embodiments, these models can include, for example, a model configured to predict a user skill level, a model configured to convert user speech to text and/or to analyze user speech, a model configured to generate speech, a model configured to generate one or several avatars including, for example, a virtual teacher, a model configured to identify one or several user interests, or the like.

The profile store 128 can include information relating to one or several user profiles. This information can include, for example, information relating to the users' personal contacts such as family member personal data (e.g., name, age, etc.) and contact information (e.g., phone number, email, etc.), personal data and contact information for friends, or a combination thereof. The information can further include information relating to the users' interests such as hobbies, reading content preferences (e.g., genre or literary format preferences), learning preferences, activities, or the like. In some embodiments, the user profile can include links to user profiles of the users' personal contacts or other suitable friends or family for which there are user profiles. Thus, in some embodiments, the profile store 128 can include information creating a social network of users.

The profile store 128 may include information relating to the end users within the system 100. Generally speaking, the profile store 128 can be a database having restrictions on access. The restrictions can govern to whether one or several users or categories of users are able to perform one or several actions on the database or on data stored in the database. In some embodiments, the profile store 128 can include any information for which access is restricted. This information may include user personal data, user characteristics such as the usernames, access credentials (e.g., logins and passwords), user preferences, and information relating to any previous user interactions within the system 100 (e.g., requested content, posted content, content modules completed, training scores or evaluations, other associated users, etc.). In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like.

In some embodiments, the profile store 128 can include information relating to a categorization of one or several users, and specifically relating to an access categorization of one or several users. In some embodiments, the categorizations of the one or several users can indicate the type of data that the user is allowed to access. Additionally or alternatively, the categorizations can indicate the degree to which the user can access, edit, retrieve, and/or provide data. The access classifications can relate to the level of responsibility of the user to enable the user to access data relevant and useful to their responsibility. In some embodiments, this data can include personal information collected from one or several individuals such as students, employees, patients, or the like. In embodiments in which this data relates to one or several students associated with the system 100, these one or several students can be, for example, one or several students taking classes via an institutional user of the content customization and delivery system 100. In some embodiments, the categories can include, for example, a trusted entity, a first tier administrator, a second tier administrator, a third tier administrator, an instructor, a guardian, and/or a student.

In some embodiments, the trusted entity can be allowed to access all data contained within the system 100, and the first tier administrator can be able to access data contained within the system 100 relating to a first tier describing a largest level of a political entity such as a school district, a university, a healthcare network, or the like. In some embodiments, the second tier administrator is able to access a subset of the data contained within the system 100 relating to the first tier, alternatively described as all of the data relating to the second tier describing a sub-level of the political entity such as a school within a school district, a college within a university, a healthcare service provider such as, for example, a clinic or a hospital, in the healthcare network, or the like. In some embodiments, the third tier administrator is able to access a subset of the data contained within the system 100 relating to the second tier, alternatively described as all of the data relating to the third tier describing a sub-level of the sub-level political entity such as, for example, a department within a school or a college, a group within a healthcare service provider, or the like. In some embodiments, the instructor can be, for example, a healthcare provider such as a doctor or a nurse, a teacher, or the like. The instructor can have access to data relating to, for example, courses or sections taught by the teacher, or patients of the healthcare provider. In some embodiments, the guardian can be an individual with legal responsibility for one or several students or patients and can thus have access to data relating to those one or several students or patients. In some embodiments, the student can be a patient or a student in a course, and can have access to their own information.

In some embodiments in which the one or several end users are individuals, and specifically are students, the profile store 128 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the system 100.

The profile store 128 can include information relating to one or several student learning preferences. In some embodiments, for example, the student may have one or several preferred learning styles, one or several most effective learning styles, or the like. In some embodiments, the learning styles can be any learning style describing how the student best learns or how the student prefers to learn. For example, the learning styles can include auditory learning, visual learning, tactile learning, Thus, a student may be identified as an auditory learner, as a visual learner, as a tactile learner, or a combination thereof. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the system 100.

The profile store 128 can further include information relating to one or several teachers or instructors who are responsible for organizing, presenting, and/or managing the presentation of information to students. In some embodiments, profile store 128 can include information identifying courses and/or subjects that have been taught by the teacher, data identifying courses, or subjects, or a combination thereof currently taught by the teacher, and/or data identifying courses, subjects, or the combination thereof that will be taught by the teacher (e.g., during a subsequent school year or semester). In some embodiments, this can include information relating to one or several teaching styles of one or several teachers. In some embodiments, the profile store 128 can further include information indicating past evaluations or evaluation reports received by the teacher. In some embodiments, the profile store 128 can further include information relating to improvement suggestions received by the teacher, training received by the teacher, continuing education received by the teacher, and/or the like. In some embodiments, this information can be stored in a tier of memory that is not the fastest memory in the system 100.

The content store 130 can include content for presentation to one or several users. In some embodiments, this content can include text, images, animations, video, audio, or the like. In some embodiments, this content can be customized to a user based on information contained in the user profile, such as, for example, user interests, user contacts, and/or user skill level.

In some embodiments, the content store 130 may include information describing the individual content items (or content resources) available via the system 100. In some embodiments, the content store 130 may include metadata, properties, and other characteristics associated with the content resources. In some embodiments, the content items can include the one or several items that can include one or several documents and/or one or several applications or programs. In some embodiments, the one or several items can include, for example, one or several webpages, presentations, papers, videos, charts, graphs, books, written work, figures, images, graphics, recordings, or any other document, or any desired software or application or component thereof including, for example, a graphical user interface (GUI), all or portions of a Learning Management System (LMS), all or portions of a Content Management System (CMS), all or portions of a Student Information Systems (SIS), or the like.

In some embodiments, the data in the content store 130 may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the content store 130 may be configured to allow updating of content metadata or properties, and to allow the addition and/or removal of information relating to the content resources. In some embodiments, the content store 130 can be organized such that content is associated with one or several courses and/or programs in which the content is used and/or provided. In some embodiments, the content store 130 can further include one or several teaching materials used in the course, a syllabus, one or several practice problems, one or several tests, one or several quizzes, one or several assignments, or the like. All or portions of the content library database can be stored in a tier of memory that is not the fastest memory in the system 100.

Figure 2:
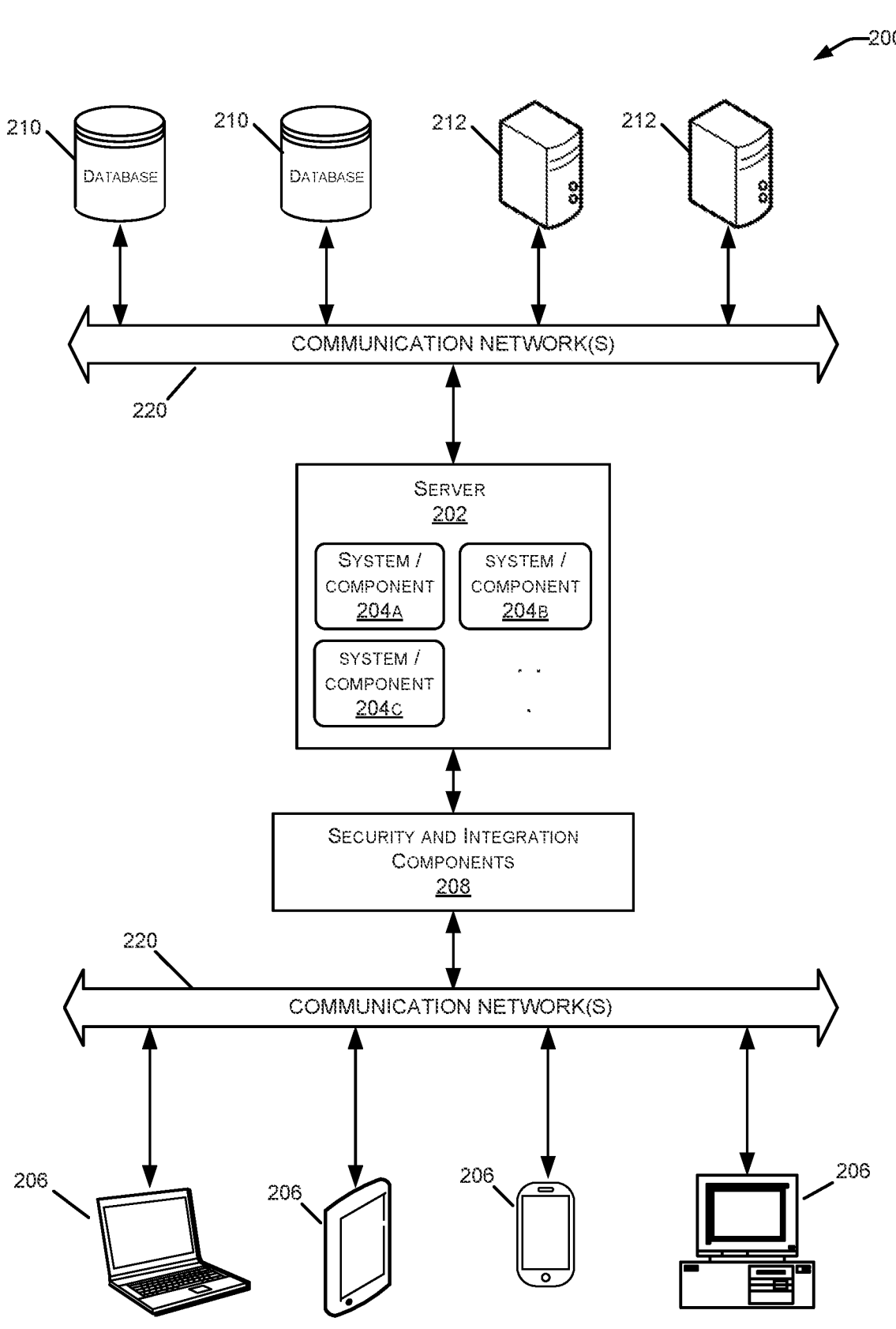
FIG. 2 is a block diagram illustrating a computer server and computing environment within the content customization and delivery system.

With reference to FIG. 2, an illustrative distributed computing environment 200 is shown including a computer server 202, four client computing devices 206, and other components that may implement certain embodiments and features described herein. In some embodiments, the server 202 may correspond to the server 122 discussed above in FIG. 1, and the client computing devices 206 may correspond to the user devices 108. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser-based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content customization and delivery systems 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content customization and delivery system 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content customization and delivery system 100. Such web services, including cross-domain and/or cross-platform web services, may be developed for enterprise use in accordance with various web service standards, such as the Web Service Interoperability (WS-I) guidelines. For example, some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using the WS-Security standard, which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more databases 210 and/or back-end servers 212. In certain examples, the databases 210 may correspond to database server(s) 124, the local data server 109, and/or the customizer data server 128 discussed above in FIG. 1, and back-end servers 212 may correspond to the various back-end servers. Databases 210 and servers 212 may reside in the same datacenter or may operate at a remote location from server 202. In some cases, one or more databases 210 may reside on a non-transitory storage medium within the server 202. Other databases 210 and back-end servers 212 may be remote from server 202 and configured to communicate with server 202 via one or more networks 220. In certain embodiments, databases 210 and back-end servers 212 may reside in a storage-area network (SAN).

Figure 3:
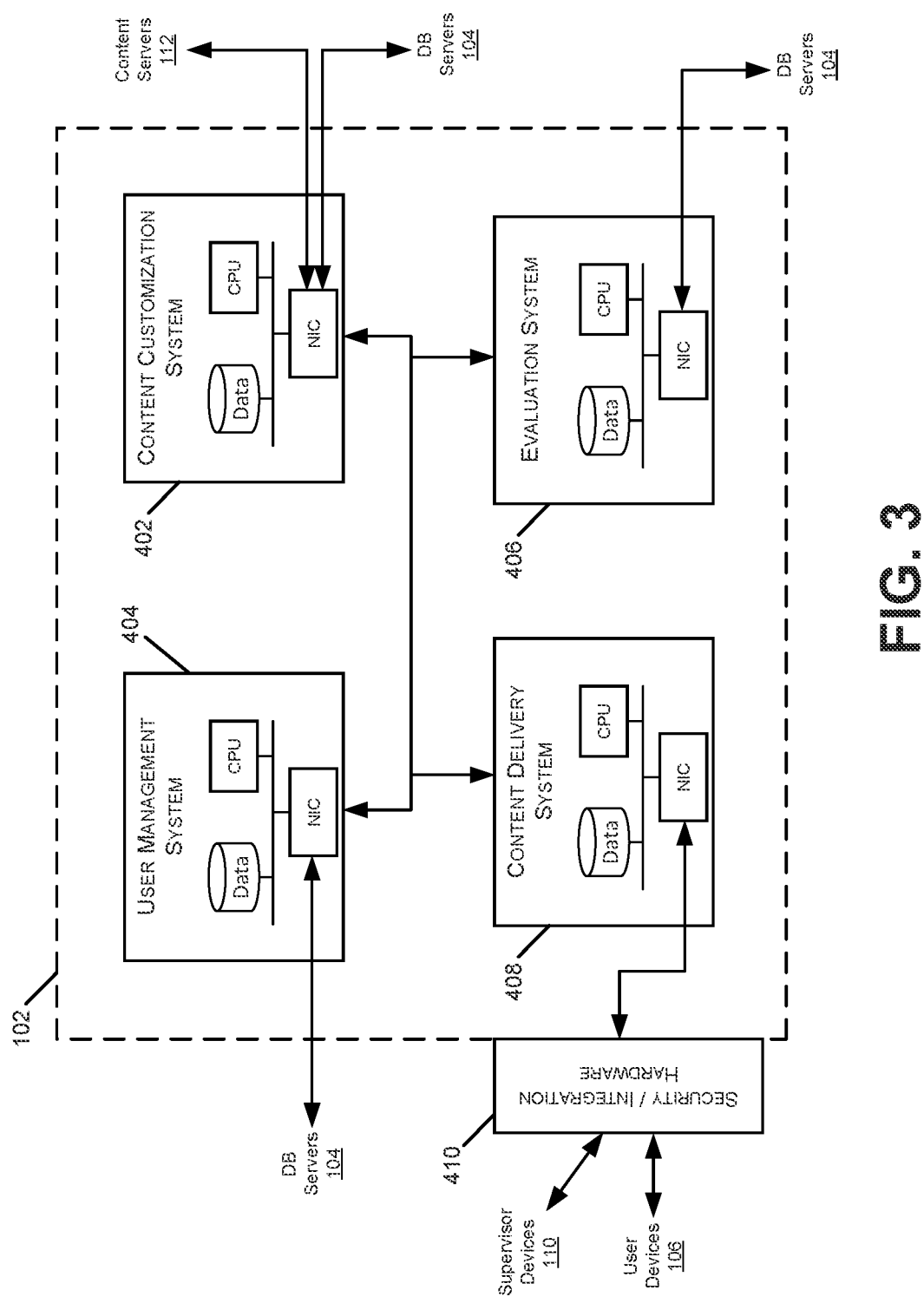
FIG. 3 is a block diagram illustrating an embodiment of one or more content management servers within the content customization and delivery system.

With reference now to FIG. 3, a block diagram is shown illustrating an embodiment of one or more servers 122 within a system 100. As discussed above, servers 122 may include various server hardware and software components that manage the content resources within the system 100 and provide interactive and adaptive content to users on various user devices 108 and/or books 102. For example, servers 122 may provide instructions to and receive information from the other devices within the system 100, in order to manage and transmit content resources, user data, and server or client applications executing within the system 100.

A server 122 may include a content customization system 302. The content customization system 302 may be implemented using dedicated hardware within the system 100 (e.g., a content customization server 302), or using designated hardware and software resources within a shared server 122. In some embodiments, the content customization system 302 may adjust the selection and adaptive capabilities of content resources to match the needs and desires of the users receiving the content. For example, the content customization system 302 may query memory 124 to retrieve user information, such as user preferences and characteristics (e.g., from a user profile database 128), and the like. Based on the retrieved information from memory 124 and other data sources, the content customization system 302 may modify content resources for individual users.

The server 122 also may include a user management system 304. The user management system 304 may be implemented using dedicated hardware within the system 100 (e.g., a user management server 304), or using designated hardware and software resources within a shared server 122. In some embodiments, the user management system 304 may monitor the progress of users through various types of content resources and groups, such as media compilations, courses or curriculums in training or educational contexts, interactive gaming environments, and the like. For example, the user management system 304 may query memory 124 to retrieve user data such as associated content compilations or programs, content completion status, user goals, results, and the like.

The server 122 also may include an evaluation system 306. The evaluation system 306 may be implemented using dedicated hardware within the system 100 (e.g., an evaluation server 306), or using designated hardware and software resources within a shared server 122. The evaluation system 306 may be configured to receive and analyze information from books 102 and/or user devices 108. For example, various ratings of content resources submitted by users may be compiled and analyzed, and then stored in a database (e.g., the content store 130) associated with the content. In some embodiments, the evaluation server 306 may analyze the information to determine the effectiveness or appropriateness of content resources with, for example, a subject matter, an age group, a skill level, or the like. In some embodiments, the evaluation system 306 may provide updates to the content customization system 302 or the user management system 304, with the attributes of one or more content resources or groups of resources within the system 100. The evaluation system 306 also may receive and analyze user evaluation data from books 102 and/or from user devices 108, etc. For instance, evaluation system 306 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

The server 122 also may include a content delivery system 308. The content delivery system 308 may be implemented using dedicated hardware within the system 100 (e.g., a content delivery system 308), or using designated hardware and software resources within a server 122. The content delivery system 308 may receive content resources from the content customization system 302, the user management system 304, or a combination thereof. The content delivery system 308 may further provide the resources to books 102, user devices 108, or a combination thereof. The content delivery system 308 may determine the appropriate presentation format for the content resources based on the user characteristics and preferences, the device capabilities of books 102 or user devices 108, or a combination thereof. If needed, the content delivery system 308 may convert the content resources to the appropriate presentation format and/or compress the content before transmission. In some embodiments, the content delivery system 308 may also determine the appropriate transmission media and communication protocols for transmission of the content resources.

In some embodiments, the content delivery system 308 may include specialized security and integration hardware 310, along with corresponding software components to implement the appropriate security features content transmission and storage, to provide the supported network and client access models, and to support the performance and scalability requirements of the system 100. The security and integration layer 310 may include some or all of the security and integration components 208 discussed above in FIG. 2, and may control the transmission of content resources and other data, as well as the receipt of requests and content interactions, to and from the books 102 and/or the user devices 108, and other devices in the system 100.

Figure 4:
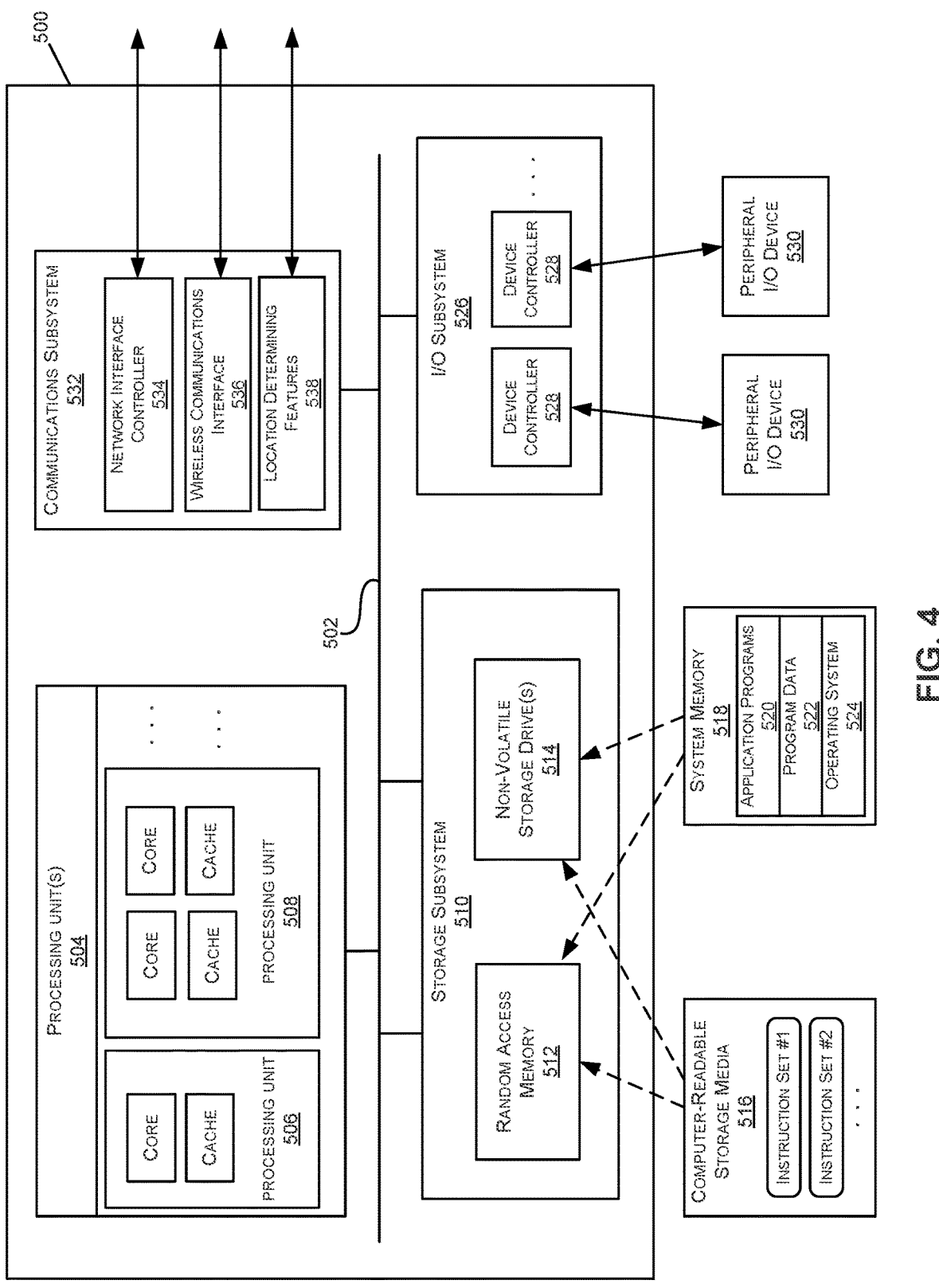
FIG. 4 is a block diagram illustrating the physical and logical components of a special-purpose computer device within the content customization and delivery system.

With reference now to FIG. 4, a block diagram of an illustrative computer system is shown. The system 400 may correspond to any of the computing devices or servers of the system 100 described above, or any other computing devices described herein. In this example, computer system 400 includes processing units 404 that communicate with a number of peripheral subsystems via a bus subsystem 402. These peripheral subsystems include, for example, a storage subsystem 410, an I/O subsystem 426, and a communications subsystem 432.

Bus subsystem 402 provides a mechanism for letting the various components and subsystems of computer system 400 communicate with each other as intended. Although bus subsystem 402 is shown schematically as a single bus, alternative embodiments of the bus subsystem may utilize multiple buses. Bus subsystem 402 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 404, which may be implemented as one or more integrated circuits (e.g., a conventional microprocessor or microcontroller), controls the operation of computer system 400. One or more processors, including single core and/or multicore processors, may be included in processing unit 404. As shown in the figure, processing unit 404 may be implemented as one or more independent processing units 406 and/or 408 with single or multicore processors and processor caches included in each processing unit. In other embodiments, processing unit 404 may also be implemented as a quad-core processing unit or larger multicore designs (e.g., hexa-core processors, octo-core processors, ten-core processors, or greater.

Processing unit 404 may execute a variety of software processes embodied in program code, and may maintain multiple concurrently executing programs or processes. At any given time, some or all of the program code to be executed can be resident in processor(s) 404 and/or in storage subsystem 410. In some embodiments, computer system 400 may include one or more specialized processors, such as digital signal processors (DSPs), outboard processors, graphics processors, application-specific processors, and/or the like.

I/O subsystem 426 may include device controllers 428 for one or more user interface input devices and/or user interface output devices 430. User interface input and output devices 430 may be integral with the computer system 400 (e.g., integrated audio/video systems, and/or touchscreen displays), or may be separate peripheral devices which are attachable/detachable from the computer system 400.

Input devices 430 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 430 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 430 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 430 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, projection devices, touch screens, and the like. In general, use of the term "output device" is intended to include all possible types of devices and mechanisms for outputting information from computer system 400 to a user or other computer. For example, output devices 430 may include, without limitation, a variety of display devices that visually convey text, graphics and audio/video information such as monitors, printers, speakers, headphones, automotive navigation systems, plotters, voice output devices, and modems.

Computer system 400 may comprise one or more storage subsystems 410, comprising hardware and software components used for storing data and program instructions, such as system memory 418 and computer-readable storage media 416. The system memory 418 and/or computer-readable storage media 416 may store program instructions that are loadable and executable on processing units 404, as well as data generated during the execution of these programs.

Depending on the configuration and type of computer system 400, system memory 318 may be stored in volatile memory (such as random access memory (RAM) 412) and/or in non-volatile storage drives 414 (such as read-only memory (ROM), flash memory, etc.) The RAM 412 may contain data and/or program modules that are immediately accessible to and/or presently being operated and executed by processing units 404. In some implementations, system memory 418 may include multiple different types of memory, such as static random access memory (SRAM) or dynamic random access memory (DRAM). In some implementations, a basic input/output system (BIOS), containing the basic routines that help to transfer information between elements within computer system 400, such as during start-up, may typically be stored in the non-volatile storage drives 414. By way of example, and not limitation, system memory 418 may include application programs 420, such as client applications, Web browsers, mid-tier applications, server applications, etc., program data 422, and an operating system 424.

Storage subsystem 410 also may provide one or more tangible computer-readable storage media 416 for storing the basic programming and data constructs that provide the functionality of some embodiments. Software (programs, code modules, instructions) that when executed by a processor provide the functionality described herein may be stored in storage subsystem 410. These software modules or instructions may be executed by processing units 404. Storage subsystem 410 may also provide a repository for storing data used in accordance with the present invention.

Storage subsystem 410 may also include a computer-readable storage media reader that can further be connected to computer-readable storage media 416. Together and, optionally, in combination with system memory 418, computer-readable storage media 416 may comprehensively represent remote, local, fixed, and/or removable storage devices plus storage media for temporarily and/or more permanently containing, storing, transmitting, and retrieving computer-readable information.

Computer-readable storage media 416 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 400.

By way of example, computer-readable storage media 416 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 416 may include, but is not limited to, Zip® drives, flash memory cards, universal serial bus (USB) flash drives, secure digital (SD) cards, DVD disks, digital video tape, and the like. Computer-readable storage media 416 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 400.

Communications subsystem 432 may provide a communication interface from computer system 400 and external computing devices via one or more communication networks, including local area networks (LANs), wide area networks (WANs) (e.g., the Internet), and various wireless telecommunications networks. As illustrated in FIG. 4, the communications subsystem 432 may include, for example, one or more network interface controllers (NICs) 434, such as Ethernet cards, Asynchronous Transfer Mode NICs, Token Ring NICs, and the like, as well as one or more wireless communications interfaces 436, such as wireless network interface controllers (WNICs), wireless network adapters, and the like. Additionally and/or alternatively, the communications subsystem 432 may include one or more modems (telephone, satellite, cable, ISDN), synchronous or asynchronous digital subscriber line (DSL) units, FireWire® interfaces, USB® interfaces, and the like. Communications subsystem 436 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 432 may be detachable components coupled to the computer system 400 via a computer network, a Fire-Wire® bus, or the like, and/or may be physically integrated onto a motherboard of the computer system 400. Communications subsystem 432 also may be implemented in whole or in part by software.

In some embodiments, communications subsystem 432 may also receive input communication in the form of structured and/or unstructured data feeds, event streams, event updates, and the like, on behalf of one or more users who may use or access computer system 400. For example, communications subsystem 432 may be configured to receive data feeds in real-time from users of social networks and/or other communication services, web feeds such as Rich Site Summary (RSS) feeds, and/or real-time updates from one or more third party information sources. Additionally, communications subsystem 432 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 432 may output such structured and/or unstructured data feeds, event streams, event updates, and the like to memory 124 that may be in communication with one or more streaming data source computers coupled to computer system 400.

Due to the ever-changing nature of computers and networks, the description of computer system 400 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

With reference now to FIG. 5, a flowchart illustrating one embodiment of a process 500 for next content selection is shown. In some examples, one or several processors or servers 122, server 202, or processing unit 402 can perform one or more of the steps shown in FIG. 5. In other examples the one or several processors or servers 122, the server 202, or the processing unit 402 can implement more steps, fewer steps, different steps, or a different order of the steps depicted in FIG. 5. The steps of FIG. 5 are described below with reference to components discussed above in FIGS. 1-4.

In some embodiments, the process 500 can include listening to a student during reading and determining, based on objective and subjective parameters student skill level, student confidence, and student engagement. For example, a student may be reading a book 102 aloud, and the listening can be performed via an I/O system 106 associated with the book 102. The objective parameters may include metrics that are based on quantifiable data and can be indicative of the student's ability to read and understand written content of the book. The objective parameters can include, for example, reading tempo (e.g., words read per minute), a reading accuracy (e.g., a percentage or other suitable measurement of words read without mistakes), comprehension scores (e.g., a number of correct answers on a set of questions regarding the book 102), an error rate (e.g., number of errors per reading segment, where the reading segment may be a page, chapter, or number of words), an average time used to decode or sound out a word, vocabulary scores (e.g., a number of correct answers on vocabulary related questions generated based on the book 102), standardized test scores, other suitable parameters, or a combination thereof.

The subjective parameters can be metrics that rely on personal interpretation or opinion and can be indicative of the student's ability to read and understand the book, the student's level of interest in the book 102, or the like. For example, the subjective parameters may include a confidence score, evaluation of student summaries of the book, predictions regarding the book, or other suitable indicators of reader comprehension, an interest score, an attitude score, other suitable metrics, or a combination thereof. The confidence score can be a score within a range (e.g., 1-5) and can indicate the student's self-perceived competence while reading. Similarly, the interest score can be a score within a range (e.g., 1-5) and can indicate the student's level of interest in the written content of the book 102. The attitude score can also be a score within a range (e.g., 1-5) and can be indicative of the student's overall feeling toward reading the book. In some examples, a low confidence score can indicate that the student is having difficulty reading the book, a low interest score can indicate that the student is uninterested in the written content of the book, and a low attitude score may indicate that the student is bored or frustrated while reading the book. The subjective parameters can be provided by the student or by a teacher, guardian, classmate, etc. associated with the student.

In some embodiments, the student engagement and student confidence can be determined via sentiment analysis. The student engagement can refer to a level of attention, interest, and optimism the student exhibits during reading. The student confidence can refer to a level of self-perceived competence during reading. For example, a student with a greater level of self-perceived competence can be more likely to put effort into pronouncing difficult words. The sentiment analysis can involve using natural language processing to analyze and predict emotional tone of the speech from the student reading aloud. The sentiment analysis can then involve determining the student engagement and student confidence based on the predicted emotional tone. In some examples, the student engagement, the student confidence, or a combination thereof can further be determined based on objective parameters (e.g., reading tempo) or subjective parameters (e.g., confidence score). The student engagement, student confidence, or a combination thereof may further depend on pauses, comments, or other suitable noises made by student during reading.

In some embodiments, the determined student engagement can be high, moderate, or low. The determined student confidence can also be high moderate or low. In some examples, a score (e.g., a score between 0 and 100) can be predicted via the sentiment analysis and/or based on the objective and subjective parameters for the student engagement, the student confidence, or a combination thereof. The score can then be correlated with a high, moderate, or low output. For example, an engagement score of thirty or less can be associated with an output of low engagement, an engagement score between greater than thirty and below sixty can be associated with an output of moderate engagement, and an engagement score above sixty can be associated with an output of high engagement.

In some embodiments, based on the student engagement, next content can be selected and/or user profile can be updated to reflect content preferences. Additionally, based on the student confidence, a skill level of the user can be selected and/or the skill level can be updated in the user profile. Next content and the skill level of next content can be selected based on the user skill level and confidence.

At block 502, user information is received. The user information can be received by the server 122 from the user device 108 and/or the book 102. The user information can include the previous objective or subjective parameters, previous student confidence or engagement scores, user interests (e.g., hobbies, reading content preferences, learning preferences, etc.), personal data for the user (e.g., name, age, gender, etc.), location data (e.g., a home address or a school address), or other suitable information relating to the user. The user information can also include information (e.g., personal data, location data, etc.) relating to user contacts. The user contacts can be family or friends of the user. In some embodiments, the user information received by the server 122 can be stored in the memory, and specifically in the profile store 128.

At block 504, a user account is generated and a user profile is generated in the user account. In some embodiments, the generation of the user profile can include determining a skill level of the user and storing the skill level of the user in the user profile. In some embodiments, the skill level of the user can be determined based on the information received in block 502, such as the previous objective parameters, previous subjective parameters, previous student confidence scores, previous student engagement scores, user reading content preferences, user age, etc. In some embodiments, the user profile can include and/or be based on the information received in block 502. The user profile can be generated by the server 122 and can be stored in the memory 124, and specifically in the profile store 128.

At block 506, audio content can be received, which audio content can be generated by the user and which audio content can correspond to textual content provided to the user. In some embodiments, the audio content can correspond to read content. The read content can be textual or written content from a printed book, eBook, or other suitable document which is read aloud by the user. The audio content may therefore be speech generated by the user reading the textual content aloud. In some embodiments, the audio content can be received by the user device 108 and/or the book 102, and specifically by the I/O system 106 of the book 102 and/or of the user device 108.

At block 508, at least one attribute of the textual content and the received audio content can be ingested into a first machine learning (ML) model, which first machine learning model can be trained to predict a user skill level. The user skill level can be a categorization of the user indicative of a level of reading proficiency and comprehension abilities of the user. The at least one attribute of the textual content can be indicative of vocabulary complexity or content comprehension difficulty of the textual content. For example, the at least one attribute can be a difficulty score for the textual content or a recommended user skill level associated with the textual content. Additionally, the at least one attribute of the textual content can characterize the type of textual content (e.g., chapter book, picture book, magazine, etc.), a format of the textual content (e.g., article, academic paper, book, etc.), a genre of the textual content (e.g., non-fiction, fiction, mystery, fantasy, etc.), or the like. In some examples, at least some of the user information can also be ingested into the first ML model. Therefore, the first ML model may further predict the user skill level based at least in part on the user information. In some embodiments, the first machine learning model can be a statistical model and can be stored in, for example, the model store 126 in the memory 124.

At block 510, the first machine learning model can generate a prediction of a user skill level based on the attributes ingested in block 508. The first machine learning model can then output the user skill level or an updated user skill level. The updated user skill level can be stored in the memory 124, and specifically in the profile store 128 of the memory 124. In some embodiments, the user profile can be updated with the updated user skill level.

At block 512, a next content recommendation is generated with a second machine learning model. In some embodiments, the second machine learning model can be configured to generate a content recommendation based on one or several attributes of the user. These one or several attributes of the user can include, for example, the user skill level and/or the user information (e.g., one or several of the user's interests, content or learning preferences, friends and/or contacts), or the like. In some embodiments, the second machine learning model can be a statistical model that can be stored in, for example, the model store 126 in the memory 124.

In some embodiments, the user skill level and at least one additional attribute of the user is ingested into the second machine learning model. The second machine learning model can then generate and output the next content recommendation. In some embodiments, the at least one additional attribute of the user can comprise an indicator of one of student engagement, student confidence, or a combination thereof. In some embodiments, the student engagement and/or the student confidence is determined via sentiment analysis. In some embodiments, the sentiment analysis is based at least partially on reading tempo, comments made by the user during reading, or noises made by user during reading.

At block 514, the next content recommendation is automatically delivered to the user. In some embodiments, this can include the server 122 providing the next content recommendation to the user via, for example, the user device 108. The next content recommendation can include a book, video, or other suitable content stored in content store 130.

Figure 6:
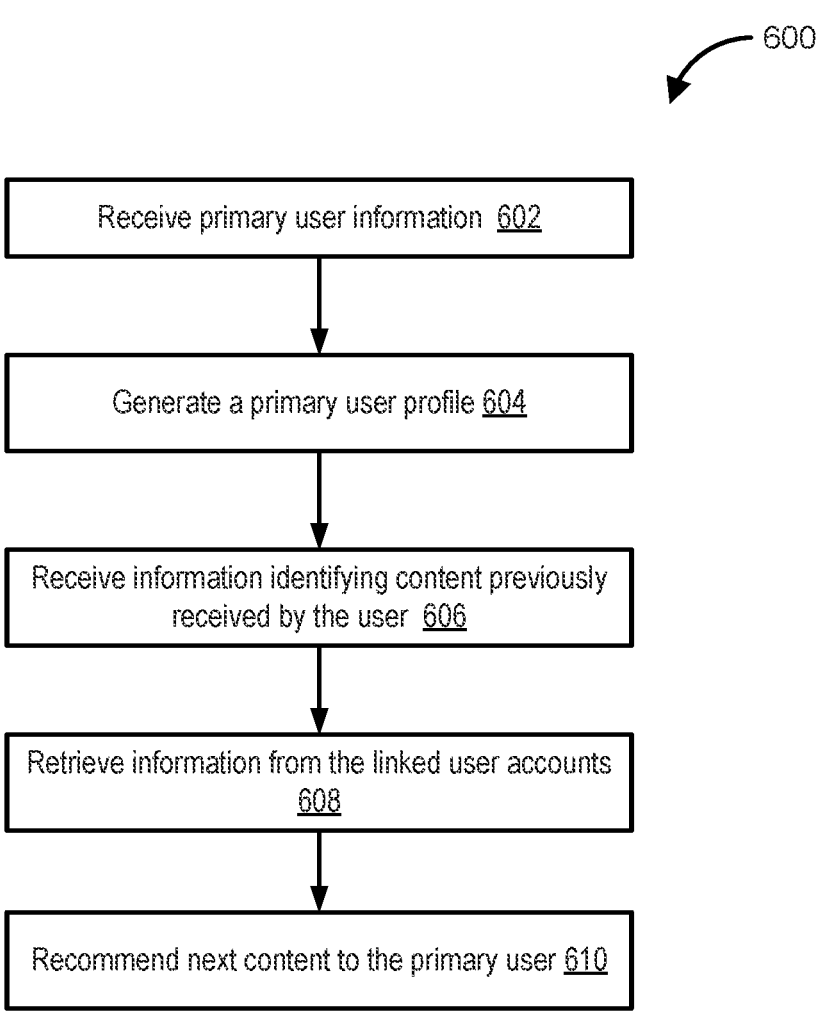
FIG. 6 is a flowchart illustrating a process for next content selection.

With reference now to FIG. 6, a flowchart illustrating one embodiment of a process 600 for next content selection is shown. In some examples, one or several processors or servers 122, server 202, or processing unit 402 can perform one or more of the steps shown in FIG. 6. In other examples the one or several processors or servers 122, the server 202, or the processing unit 402 can implement more steps, fewer steps, different steps, or a different order of the steps depicted in FIG. 6. The steps of FIG. 6 are described below with reference to components discussed above in FIGS. 1-4.

In some embodiments, the process 600 relates to the use of both a user profile and prior book selections to identify content of one or several next books presented to the reader. This can also include selecting a next book based on content selected by one or several other readers linked with the reader, such as, one or several friends of the reader.

The process 600 begins at block 602, wherein primary user information is received. The primary user information can be received by the server 122 from the user device 108 and/or the book 102. The primary user information can identify a primary user (e.g., by including personal data for the primary user) and at least one interest (e.g., by including a reading content preference, learning preference, hobby, or the like) of the primary user. A primary user can be a user for which a content recommendation of process 600 is generated. In some embodiments, the primary user information received by the server 122 can be stored in the memory, and specifically in the profile store 128.

At block 604, a user account for the primary user is generated and a user profile for the primary user is generated in the user account. In some embodiments, the generation of the user profile can include determining a skill level of the user and storing the skill level of the user in the user profile. In some embodiments, the skill level of the user can be determined based on the information received in block 602. In some embodiments, the user profile can include and/or be based on the information received in block 602. In some embodiments, the primary user profile can be based on the received primary user information and/or the primary user profile including information identifying a plurality of user accounts linked to the primary user account. The user profile can be generated by the server 122 and can be stored in the memory 124, and specifically in the profile store 128.

At block 606, information identifying content previously received by the user is received. In some embodiments, this information can identify one or several attributes associated with this previously received content. The one or several attributes can include a type of content, a genre of the content, a format of the content, etc. In some embodiments, the one or several attributes of the previously received content can include an indicator of user affinity for the subject of the received content. For example, the indicator of the user affinity of the subject of the received content can be a student engagement score, student confidence score, one or more subjective parameters, or one or more objective parameters determined based on audio content of the user reading the previously received content, test scores associated with the previously received content, or the like.

At block 608, information from user accounts linked to the primary user account is received. The user accounts can be linked to the primary user account based on the primary user information. Additionally or alternatively, the user accounts can be linked to the primary user account based on a commonality between the accounts such as a school, hobby, content preference, etc. In some embodiments, the information received can identify a degree of commonality of interest between the users of the user accounts linked to the primary user account. Additionally or alternatively, the information received can include an indication of an affinity of the user of each of the linked user accounts to a subject (e.g., a genre) of previously received content.

At block 610, next content is recommended to the primary user. In some embodiments, the recommendation of the next content can be generated by a machine learning model trained to generate a content recommendation. In some embodiments, the machine learning model can comprise a statistical model that can be stored in the memory and/or in the model store 126. In some embodiments, the machine learning model can ingest information from the primary user profile, information relating to content previously received by the primary user, and information retrieved from user accounts linked to the primary user profile. The machine learning model can then output the content recommendation based on the ingested information.

In some embodiments, next content can be recommended to the primary user based at least in part on information retrieved from the linked user accounts and based on an identified commonality of interest (e.g., a hobby, school, etc.) between the primary user and the user of each of the linked user accounts and/or an affinity between the user of each of the linked user accounts and the primary user. The affinity between the user of each of the linked user accounts and the primary user can be a level of commonality determined based on a number of commonalities of interest. For example, the affinity can be high for users with more than a number (e.g., 3 or 5) commonalities of interest. The number of commonalities of interest between the primary user and a user of a linked account can be identified based on user information in the linked user account and the primary user information. In some embodiments, recommending next content with the machine learning can include weighting an affinity for the user of each of the linked user accounts according to the commonality of interest between each of those users of the linked user accounts and the primary user. For example, an affinity that is based on hobby or reading preference commonalities can have more weight than an affinity that is based on school or location commonalities.

The next content recommendation can, in some embodiments, be automatically delivered to the user. In some embodiments, this can include the server 122 providing the next content recommendation to the user via, for example, the user device 108.

Figure 7:
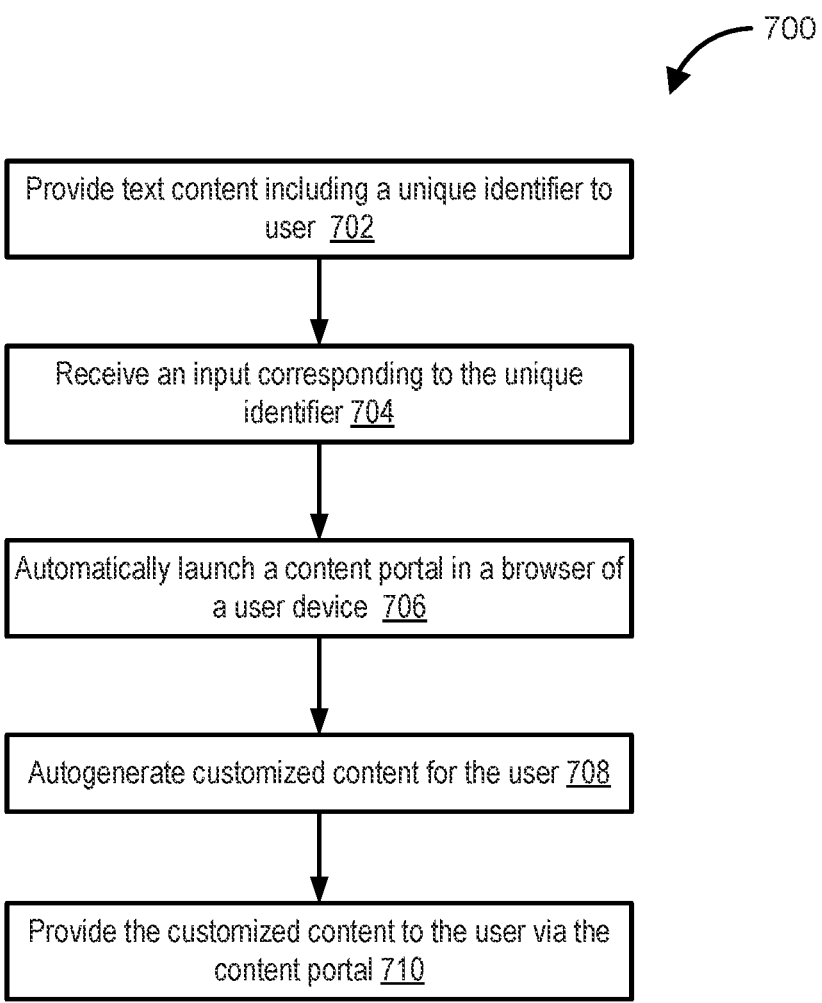
FIG. 7 is a flowchart illustrating one embodiment of a process for customized content generation and delivery.

With reference now to FIG. 7, a flowchart illustrating one embodiment of a process 700 for customized content delivery is shown. In some examples, one or several processors or servers 122, server 202, or processing unit 402 can perform one or more of the steps shown in FIG. 5. In other examples the one or several processors or servers 122, the server 202, or the processing unit 402 can implement more steps, fewer steps, different steps, or a different order of the steps depicted in FIG. 7. The steps of FIG. 7 are described below with reference to components discussed above in FIGS. 1-4.

In some embodiments, the process 700 can relates to the inclusion of a unique identifier on each book, which identifier links to a video portal. These videos in the video portal can be customized based on reader attributes and preferences. Additionally, process 700 can include auto-generating and eBook with the reader's name, identifying expected student struggles with a book, coaching responsive to the reader's skill level, etc.

The process 700 begins at block 702, wherein text content including a unique identifier is provided to a user. In some embodiments, the text content can include printed text content (e.g., a book) and/or digital text content (e.g., an eBook). In some embodiments, the text content can include a unique identifier such as a barcode, an electronic identifier (e.g., an RFID tag or NFC tag), or the like. The barcode can be a 1D barcode, a 2D barcode, and/or a 3D barcode. In some embodiments, the unique identifier can link to a content portal unique to the user. The content portal can comprise a digital content portal located on a network such as located in the internet.

At block 704, an input is received, which input corresponds to the unique content identifier. In some embodiments, this input can be received by the user device 108 and/or the book 102, and can be provided to the server 122. In some embodiments, the user device 108 can read the unique identifier. For example, the barcode (e.g., a QR code) can be read by the user device 108 via a camera or other sensor of the user device 108. The information contained in the unique identifier and/or an image of the unique identifier itself can be provided to the server 122 by the user device 108.

At block 706, the content portal corresponding to the unique identifier can be launched in a browser of the user device 108. The content portal can be associated with the unique identifier such that only the content portal can be accessed via the unique identifier. Additionally or alternatively, the content portal can be associated with a user such that when the content portal is accessed via the user device reading the unique identifier, the content portal is specific to (e.g., customized for) the user. In some embodiments, launching the content portal can include the performing of one or several procedures to verify the identity of the user, user device, and/or of the unique content portal. In some embodiments, these procedures can include the exchange of one or several tokens, keys, signatures, or the like.

For example, due to the user device 108 reading the unique identifier or due to the user device 108 being registered or otherwise associated with a user profile, the user device 108 can receive and store a token. In some examples, the token may be received and stored at the user device 108 as a result of a user inputting authentication credentials (e.g., a username and password) at the user device. The token can then be transmitted from the user device 108 to the server 122, and the server 122 can verify the identity of the user device 108 based on the token. Once the identity of the user device 108 is verified, the server 122 can cause the content portal to automatically launch in the browser. Additionally or alternatively, upon the user device reading the unique identifier, the server 122 can receive a digital signature associated with the content portal. Then, the server 122 can verify the digital signature using a key, and based on verifying the digital signature the server 122 can verify the identity of the content portal and launch the content portal at the browser of the user device 108.

At bock 708, customized content is autogenerated for the user. In some embodiments, this can include the autogeneration of customized content via a machine learning model configured for the generation of customized content. This machine learning model can be a statistical model stored in the memory 124, and specifically in the model store 126. In some embodiments, user information (e.g., user skill level, objective or subjective parameters, personal data, location data, etc.) can be ingested into the machine learning model. Additionally, in some embodiments, user information from user accounts linked with the user account of the user can be ingested into the machine learning model. The user information from user accounts may include commonalities with the user, autogenerated or previously received textual content for the linked user accounts, or other suitable user information. The machine learning model can then output the customized content based on the ingested information. The customized content can be customized based on a skill level of the user and on an interest of the user. That is, the customized content can have a sufficient difficulty level with respect to the user skill level of the user and can include content reflecting a hobby, reading preference interest, or the like of the user. In some embodiments, the customized content can include an eBook, a video, audio, or the like. In some embodiments, the video can be generated based on a user learning preference. For example, the user may be a visual or auditory learner. Thus, the video may include visual and auditory content that corresponds with the textual content and/or an autogenerated eBook. In some embodiments, the autogeneration of the customized content can be triggered based on received on the input corresponding to the unique identifier.

At block 710 the customized content can be provided to the user via the content portal of the user. For example, the customized content can be output to the user via the content portal in the browser of the user device 108. In some embodiments, the customized content can be generated by the server 122, and can be provided to the user and specifically to the user device 108 via the content portal.

With reference now to FIG. 8, a flowchart illustrating one embodiment of a process 800 for autogenerating a virtual teacher is shown. In some examples, one or several processors or servers 122, server 202, or processing unit 402 can perform one or more of the steps shown in FIG. 8. In other examples the one or several processors or servers 122, the server 202, or the processing unit 402 can implement more steps, fewer steps, different steps, or a different order of the steps depicted in FIG. 8. The steps of FIG. 8 are described below with reference to components discussed above in FIGS. 1-4.

In some embodiments, the process 800 can include combining features extracted from a user reading a book with automated video generations and generating a virtual teacher that provides feedback to the student as they read. In some embodiments, this can further include the generating of one or several custom instructional videos. In some embodiments, the generation of a virtual teacher can include, for example, customizing the sex, appearance, voice, personality, etc. to match one or several user preferences.

At block 802, user information is received. The user information can be received by the server 122 from the user device 108 and/or the book 102. The user information can identify at least one user and at least one interest of the user. In some embodiments, the user information can identify a user and at least one learning preference of the user. In some embodiments, the learning preference identifies a plurality of attributes of an ideal teacher. In some embodiments, the plurality of attributes include gender, appearance, voice, personality, or a combination thereof. In some embodiments, the user information received by the server 122 can be stored in the memory, and specifically in the profile store 128.

At block 804, a user account for the user is generated and a user profile for the user is generated in the user account. In some embodiments, the generation of the user profile can include determining a skill level of the user and storing the skill level of the user in the user profile. In some embodiments, the skill level of the user can be determined based on the information received in block 802. In some embodiments, the user profile can be based on the received user information and/or the user profile including information identifying a plurality of user accounts linked to the user account. The user profile can be generated by the server 122 and can be stored in the memory 124, and specifically in the profile store 128.

At block 806 a skill level of the user is determined. In some embodiments, this skill level can be determined based on information relating to the user. In some embodiments, this information can be received from the user profile. In some embodiments, the user skill level can be determined by ingesting information into a machine learning model trained to generate a prediction of a skill level. In some embodiments user information can be ingested into the machine learning model to generate an output corresponding to the user skill level. In some embodiments, and upon determining the user skill level, the user profile can be updated to include the user skill level.

At block 808, a skill is identified for teaching to the user. In some embodiments, this can include identifying one or several skills to be taught to the user by content to be provided to the user and/or by instruction to be provided to the user. In some embodiments, this skill can be identified by the server and/or by a machine learning model based on the skill level of the user and/or one or several attributes of the user. In some embodiments, for example, the user profile can include information relating to user mastery of a plurality of skills. This mastery can include a complete mastery and/or a partial mastery.

In some embodiments, for example, the system, and specifically the content store 130 can include content network and/or a skill network, and specifically a hierarchical content network and/or a hierarchical skill network that can identify a plurality of skills linked in hierarchical relationships. In some embodiments, and based on user information and/or on a user skill level, the location of the user in the hierarchical skill network can be determined. In some embodiments, next content and/or next skills can be linked with the current location of the user in the hierarchical skill network. In some embodiments, the skill can be associated with one or several learning objectives. Thus, in some embodiments, knowledge of the user location in the skill network can allow determination of one or several next skills to be mastered by the user, and/or one or several learning objectives to master the one or several next skills.

At block 810, information from the user profile, the user skill level, and/or the next skill are ingested into a machine learning model. In some embodiments, the machine learning model can be trained to autogenerate content based on the ingested inputs. This autogenerated content can be video content, including, for example, video of a virtual teacher.

At block 812, instructional content is autogenerated. In some embodiments, the instructional content can include video of a virtual teacher. In some embodiments, the virtual teacher can be a computer-generated video of a teacher having attributes corresponding to the plurality of attributes of the ideal teacher. In some embodiments, generating the instructional content can include generating content tailored to previously demonstrated user weakness. In some embodiments, the video of the virtual teacher can be generated by the machine learning model configured for autogeneration of content to which information was ingested in block 810.

At block 814, the instructional content is presented to the user. In some embodiments, this can include the presentation of the video content to the user via the user device 108 and/or via the book 102. In some embodiments, steps 810-814 can be iteratively performed. Specifically, in some embodiments, a portion of instructional content can be generated and presented to the user, and based on user feedback and/or user interaction with the instructional content, further content can be generated. This can be in the form of the virtual teacher presenting content, the student asking a question, and further instructional content being generated that includes an answer to the question. Or, in some embodiments, this iterative performing of steps 810-814 can include generating instructional content, providing that content to the user, receiving user feedback indicating understanding of the instructional content, and generating further instructional content based on the received user feedback.

Figure 9:
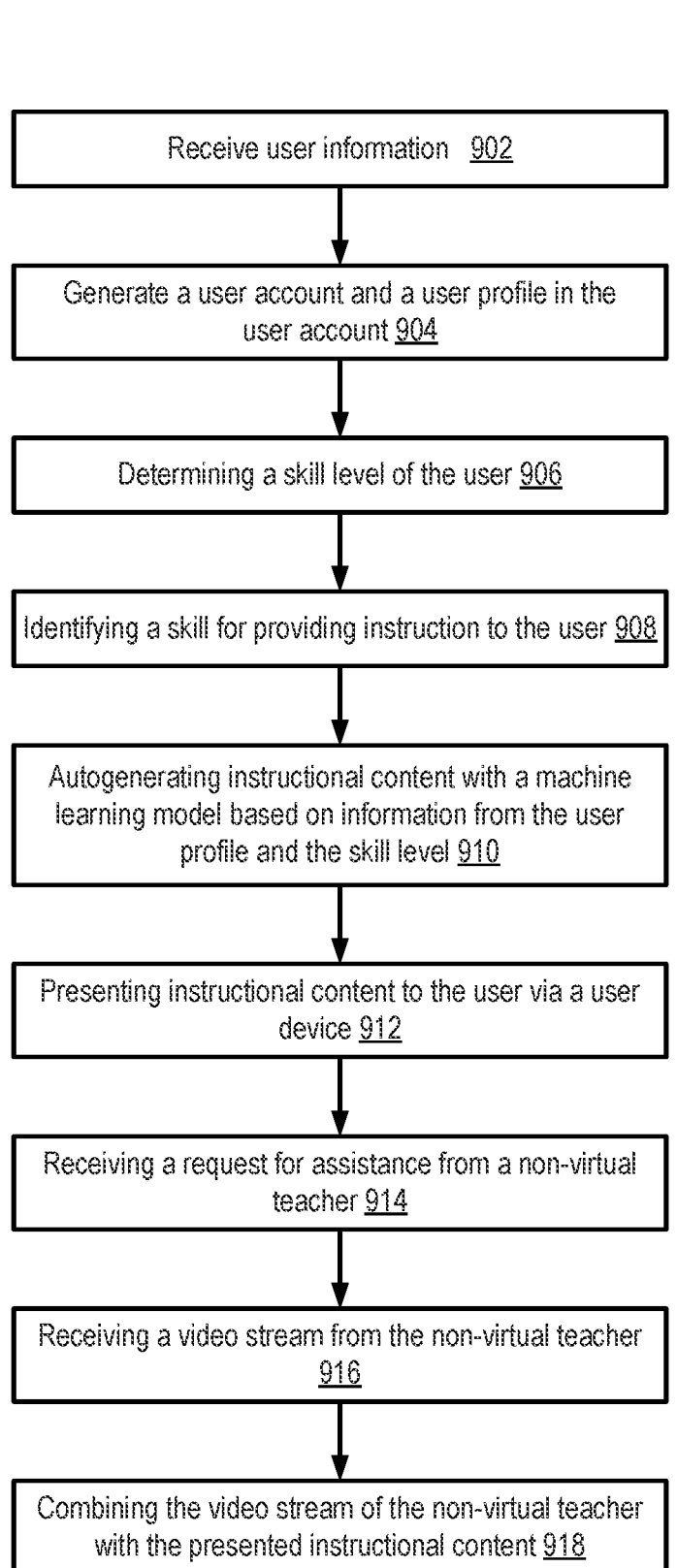
FIG. 9 is a flowchart illustrating one embodiment of a process for augmented reality instruction.

With reference now to FIG. 9, a flowchart illustrating one embodiment of a process 900 for augmented reality instruction is shown. In some examples, one or several processors or servers 122, server 202, or processing unit 402 can perform one or more of the steps shown in FIG. 5. In other examples the one or several processors or servers 122, the server 202, or the processing unit 402 can implement more steps, fewer steps, different steps, or a different order of the steps depicted in FIG. 9. The steps of FIG. 9 are described below with reference to components discussed above in FIGS. 1-4.

In some embodiments, the process 900 relates to the creation of augmented reality instruction that can include both a virtual teacher and a real teacher. For example, in some embodiments, most interactions with a user can be by a virtual, animated teacher. Periodically, a real teacher can join the virtual learning environment, which can include the merging of video streams, and specifically can include merging the video stream of the virtual teacher with the video stream of the real teacher. In some embodiments, this can be facilitated by having a stable of real teachers, and upon request by the student, a real teacher could be added to the interaction between the student and the virtual teacher to facilitate learning. This request could come in the form of the student hitting a "help" button. This could further include linking the student to the teacher and having subsequent follow-ups.

At block 902, user information is received. The user information can be received by the server 122 from the user device 108 and/or the book 102. The user information can identify at least one user and at least one interest of the user. In some embodiments, the user information can identify a user and at least one learning preference of the user. In some embodiments, the learning preference identifies a plurality of attributes of an ideal teacher. In some embodiments, the plurality of attributes include at least one of: sex; appearance; voice; and personality. In some embodiments, the user information received by the server 122 can be stored in the memory, and specifically in the profile store 128.

At block 904, a user account for the user is generated and a user profile for the user is generated in the user account.

In some embodiments, the generation of the user profile can include determining a skill level of the user and storing the skill level of the user in the user profile. In some embodiments, the skill level of the user can be determined based on the information received in block 902. In some embodiments, the user profile can be based on the received user information and/or the user profile including information identifying a plurality of user accounts linked to the user account. The user profile can be generated by the server 122 and can be stored in the memory 124, and specifically in the profile store 128.

At block 906 a skill level of the user is determined. In some embodiments, this skill level can be determined based on information relating to the user. In some embodiments, this information can be received from the user profile. In some embodiments, the user skill level can be determined by ingesting information into a machine learning model trained to generate a prediction of a skill level. In some embodiments user information can be ingested into the machine learning model to generate an output corresponding to the user skill level. In some embodiments, and upon determining the user skill level, the user profile can be updated to include the user skill level.

At block 908, a skill is identified for teaching to the user. In some embodiments, this can include identifying one or several skills to be taught to the user by content to be provided to the user and/or by instruction to be provided to the user. In some embodiments, this skill can be identified by the server and/or by a machine learning model based on the skill level of the user and/or one or several attributes of the user. In some embodiments, for example, the user profile can include information relating to user mastery of a plurality of skills. This mastery can include a complete mastery and/or a partial mastery.

In some embodiments, for example, the system, and specifically the content store 130 can include content network and/or a skill network, and specifically a hierarchical content network and/or a hierarchical skill network that can identify a plurality of skills linked in hierarchical relationships. In some embodiments, and based on user information and/or on a user skill level, the location of the user in the hierarchical skill network can be determined. In some embodiments, next content and/or next skills can be linked with the current location of the user in the hierarchical skill network. In some embodiments, the skill can be associated with one or several learning objectives. Thus, in some embodiments, knowledge of the user location in the skill network can allow determination of one or several next skills to be mastered by the user, and/or one or several learning objectives to master the one or several next skills.

At block 910, instructional content is autogenerated. This is based on the ingestion of information from the user profile, the user skill level, and/or the next skill into a machine learning model. In some embodiments, the machine learning model can be trained to autogenerate content based on the ingested inputs. This autogenerated content can be video content, including, for example, video of a virtual teacher.

The instructional content can include video of a virtual teacher. In some embodiments, the virtual teacher can be a computer-generated video of a teacher having attributes corresponding to the plurality of attributes of the ideal teacher. In some embodiments, generating the instructional content can include generating content tailored to previously demonstrated user weakness.

At block 912, the instructional content is presented to the user. In some embodiments, this can include the presentation of the video content to the user via the user device 108 and/or via the book 102. In some embodiments, steps 810-814 can be iteratively performed. Specifically, in some embodiments, a portion of instructional content can be generated and presented to the user, and based on user feedback and/or user interaction with the instructional content, further content can be generated. This can be in the form of the virtual teacher presenting content, the student asking a question, and further instructional content being generated that includes an answer to the question. Or, in some embodiments, this iterative performing of steps 910 and 912 can include generating instructional content, providing that content to the user, receiving user feedback indicating understanding of the instructional content, and generating further instructional content based on the received user feedback.

At block 914, a request for assistance from a non-virtual teacher is received. In some embodiments, this request can be received by the server 122 from the user via the book 102 and/or the user device 108. In some embodiments, this request can be received via user interaction with a feature in a graphical user interface (GUI) such as a graphical feature in the GUI such as a button.

At block 916, the system can connect with a non-virtual teacher. This can include identifying a non-virtual teacher corresponding to the user. This can include identifying an available non-virtual teacher based on one or several user preferences stored in the user profile. Connecting with the non-virtual teacher can further include identifying the non-virtual teacher corresponding to the content giving rise to the request for assistance. In some embodiments, for example, an available non-virtual teacher can be selected based on competence in teaching the skill and/or learning objectives associated with the content giving rise to the student request.

In some embodiments, and in response to the request of assistance from a non-virtual teacher can result in identifying a set of available non-virtual teachers, selecting one of the set of available non-virtual teachers; and prompting the selected one of the non-virtual teachers to connect to the presentation of instructional content. In some embodiments, the one of the available non-virtual teachers is selected based on information relating to the user. In some embodiments, the information relating to the user identifies a learning preference.

After the non-virtual teacher has been identified, the non-virtual teacher can be invited to connect with the student. This can include providing a prompt in a GUI of the non-virtual teacher's user device. If the teacher accepts the prompt accepts to communicate with the student, a video stream of the teacher can be generated by, for example, a camera of the teacher's user device. This video stream can be communicated from the teacher's user device to the server 122.

At block 918, the video stream of the non-virtual teacher can be combined with the instructional content and can be presented to the user. In some embodiments, this can include taking at least a portion of the video stream of the non-virtual teacher and combining it with the generated instructional content including the virtual teacher. In some embodiments, the video stream of the non-virtual teacher can be combined with the presented instructional content such that the non-virtual teacher appears next to the virtual teacher on the user device.

In some embodiments, this combination of video streams can be performed by the server 122, and the combined video stream can be provided to both the non-virtual teacher and the user. In some embodiments, and as part of the combination of the video streams, the non-virtual teacher can interact with the virtual teacher to identify what content has already been provided to the student and to identify the context of the student's question. In some embodiments, the combined video streams can be provided by the server 122 to the user devices 108, and the video streams can be displayed in the GUI of the user devices to the teacher and to the student.

In some embodiments, combining the video streams can include modifying an aspect of the video stream before combining the video stream of the non-virtual teach with the presented instructional content. In some embodiments, modifying the aspect of the video stream includes generating an animation of the non-virtual teacher, and combining the animation with the presented instructional content.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system comprising:
a processor; and
a memory that includes instructions executable by the processor for causing the processor to perform operations comprising:
provide text content to a user, the text content including a unique identifier, the unique identifier linking to a content portal, the content portal unique for the user;
receiving an input corresponding to the unique identifier, wherein the input is received via a user device;
automatically launching the content portal in a browser of the user device; and
autogenerating customized content for the user, the customized content comprising an eBook, wherein the content is customized based on a skill level of the user and on an interest of the user, the skill level of the user comprising at least one objective parameter and at least one subjective parameter.

2. The system of claim 1, wherein the customized content further comprises a video, wherein the video is generated based on a user learning preference.

3. The system of claim 1, wherein auto-generation of the customized content is triggered based on receiving the input corresponding to the unique identifier.

4. The system of claim 1, wherein the operations further comprise performing at least one procedure to verify an identity of the user device and of the content portal, wherein the at least one procedure involves an exchange of at least one token.

5. The system of claim 1, wherein the customized content for the user is autogenerated via a machine learning model, wherein the machine learning model is configured to autogenerate the customized content based on at least the skill level of the user and the interest of the user.

6. The system of claim 1, wherein the operations further comprise outputting the customized content to the user via the content portal in the browser of the user device.

7. The system of claim 1, wherein the unique identifier comprises a 2D barcode.

8. A non-transitory computer-readable medium comprising instructions that are executable by a processor for causing the processor to perform operations comprising:

providing text content to a user, the text content including a unique identifier, the unique identifier linking to a content portal unique for the user;

receiving an input corresponding to the unique identifier, wherein the input is received via a user device;

automatically launching the content portal in a browser of the user device; and autogenerating customized content for the user, the customized content comprising an eBook, wherein the content is customized based on a skill level of the user and on an interest of the user, the skill level of the user comprising one or more of reading tempo, reading accuracy, indicators of user comprehension, vocabulary score, a confidence score, and an interest score.

9. The non-transitory computer-readable medium of claim 8, wherein the customized content further comprises a video, wherein the video is generated based on a user learning preference.

10. The non-transitory computer-readable medium of claim 8, wherein auto-generation of the customized content is triggered based on receiving the input corresponding to the unique identifier.

11. The non-transitory computer-readable medium of claim 8, wherein the operations further comprise performing at least one procedure to verify an identity of the user device and of the content portal, wherein the at least one procedure involves an exchange of at least one token.

12. The non-transitory computer-readable medium of claim 8, wherein the customized content for the user is autogenerated via a machine learning model, wherein the machine learning model is configured to auto-generate the customized content based on at least the skill level of the user and the interest of the user.

13. The non-transitory computer-readable medium of claim 8, wherein the operations further comprise outputting the customized content to the user via the content portal in the browser of the user device.

* * * * *